United States Patent
Chien et al.

(10) Patent No.: US 9,444,659 B2
(45) Date of Patent: Sep. 13, 2016

(54) VOLTAGE MODE TRANSMITTER

(71) Applicants: GLOBAL UNICHIP CORPORATION, Hsinchu (TW); TAIWAN SEMICONDUCTOR MANUFACTURING CO., LTD., Hsin-Chu (TW)

(72) Inventors: Ting-Hsu Chien, Hsinchu (TW); Chen-Yang Pan, Hsinchu (TW); Da-Rong Huang, Hsinchu (TW)

(73) Assignees: GLOBAL UNICHIP CORPORATION, Hsinchu (TW); TAIWAN SEMICONDUCTOR MANUFACTURING CO., LTD., Hsin-Chu (TW)

( * ) Notice: Subject to any disclaimer, the term of this patent is extended or adjusted under 35 U.S.C. 154(b) by 0 days.

(21) Appl. No.: 14/689,725

(22) Filed: Apr. 17, 2015

(65) Prior Publication Data
US 2015/0319014 A1 Nov. 5, 2015

(30) Foreign Application Priority Data
May 5, 2014 (TW) .............................. 103115966 A

(51) Int. Cl.
*H04L 25/08* (2006.01)
*H04L 25/02* (2006.01)
*H04B 3/54* (2006.01)
*H04L 25/03* (2006.01)

(52) U.S. Cl.
CPC .......... *H04L 25/03343* (2013.01); *H04B 3/54* (2013.01); *H04L 25/0278* (2013.01); *H04L 25/0288* (2013.01); *H04L 25/085* (2013.01)

(58) Field of Classification Search
CPC .......... H04L 25/028; H04L 25/03343; H04L 25/061; H04B 1/04
See application file for complete search history.

(56) References Cited

U.S. PATENT DOCUMENTS

| | | | | |
|---|---|---|---|---|
| 4,517,518 A | * | 5/1985 | Ishigaki | H03G 3/345 327/180 |
| 8,446,173 B1 | * | 5/2013 | Faucher | H03K 19/00361 326/27 |
| 2014/0044160 A1 | * | 2/2014 | Lee | H04L 25/03019 375/232 |

OTHER PUBLICATIONS

Marcel Kossel et al, "A T-Coil-Enhanced 8.5 Gb/s High-Swing SST Transmitter in 65 nm Bulk CMOS With < -16 dB Return Loss Over 10 GHz Bandwidth", IEEE Journal of Solid-State Circuits, vol. 43, Dec. 2008.

* cited by examiner

*Primary Examiner* — Shuwang Liu
*Assistant Examiner* — Gina McKie
(74) *Attorney, Agent, or Firm* — WPAT, PC; Justin King; Douglas A. Hosack

(57) ABSTRACT

A voltage mode transmitter includes a resistive network and a de-emphasis value controller. The resistive network receives plural input voltages and provides plural weighting values corresponding to respective input voltages. A sum of the products of the plural input voltages and the corresponding weighting values is equal to an output voltage. The de-emphasis value controller receives a first signal. After the first signal is inverted as an inverted first signal and the inverted first signal is delayed for a time period, the de-emphasis value controller generates a second signal. The de-emphasis value controller further receives a value control signal. At least one of the plural input signals is provided by the first signal and at least one of the plural input signals is provided by the second signal according to the value control signal.

18 Claims, 8 Drawing Sheets

VOLTAGE MODE TRANSMITTER

This application claims the benefit of Taiwan Patent Application No. 103115966, filed May 5, 2014, the subject matter of which is incorporated herein by reference.

FIELD OF THE INVENTION

The present invention relates to a voltage mode transmitter, and more particularly to a voltage mode transmitter with a resistive network.

BACKGROUND OF THE INVENTION

FIG. 1A is a schematic circuit diagram illustrating the relationship between a transmitter and a receiver in a current mode according to the prior art. The transmitter Tx comprises a differential pair including two transistors M1 and M2. The two transistors M1 and M2 are controlled according to differential signals DP and DN, respectively. When the transistor M1 is turned on, a current Icm flows through the transistor M1. Consequently, a current with a magnitude Icm/2 flows to a resistor R of the receiver Rx through channels. Under this circumstance, a voltage drop across the resistor R of the receiver Rx is equal to (R×Icm)/2.

FIG. 1B is a schematic circuit diagram illustrating the relationship between a transmitter and a receiver in a voltage mode according to the prior art. When the transistors Mp1 and Mn2 of the transmitter Tx are turned on according to differential signals DP and DN, a current Ivm flows to a resistor 2R of the receiver Rx through two channels. Under this circumstance, a voltage drop across the resistor 2R of the receiver Rx is equal to (2R×Ivm).

If the voltage drop across the resistor R of the receiver Rx of FIG. 1A and the voltage drop across the resistor 2R of the receiver Rx of FIG. 1B are equal, (R×Icm)/2=2R×Ivm. Consequently, Icm=4×Ivm. In other words, for providing the same intensity signal to the receiver Rx, the magnitude of the current provided by the voltage mode transmitter Tx is lower. Consequently, in comparison with the current mode transmitter Tx, the voltage mode transmitter Tx has lower power consumption.

Generally, the channel between the transmitter Tx and the receiver Rx may result in frequency-dependent attenuation. For mitigating the inter-symbol-interference (ISI) resulting from the frequency-dependent attenuation, the signal to be transmitted from the transmitter Tx to the receiver Rx is previously processed by an equalization technique.

FIG. 2A is a schematic timing waveform diagram illustrating the output signals of the transmitter, in which the output signals are not processed by the equalization technique. FIG. 2B is a schematic timing waveform diagram illustrating the output signals of the transmitter, in which the output signals are processed by the equalization technique. Generally, the transmitter Tx and the receiver Rx are in communication with each other through two channels CH1 and CH2. In other words, the channels CH1 and CH2 are substantially a low pass filter. The high-frequency components of the output signals Vo+ and Vo− are largely attenuated by the channels CH1 and CH2. The low frequency components of the output signals Vo+ and Vo− are slightly attenuated by the channels CH1 and CH2.

Please refer to FIG. 2A. Since the output signals Vo+ and Vo− from the transmitter Tx are not processed by the equalization technique, the output signals Vo+ and Vo− have rectangular waveforms. After the output signals Vo+ and Vo− are transmitted through the channels CH1 and CH2, the output signals Vo+ and Vo− are turned into the input signals Vi+ and Vi− of the receiver Rx. Obviously, the high-frequency components of the input signals Vi+ and Vi− are attenuated and suffered from serious distortion.

Please refer to FIG. 2B. Since the output signals Vo+ and Vo− from the transmitter Tx are processed by the equalization technique, high-frequency components of the output signals Vo+ and Vo− are previously emphasized. After the output signals Vo+ and Vo− are transmitted through the channels CH1 and CH2, the output signals Vo+ and Vo− are turned into the input signals Vi+ and Vi− of the receiver Rx. Under this circumstance, the distortions of the input signals Vi+ and Vi− are largely reduced.

FIG. 2C schematically illustrates the definition of a de-emphasis value. According to the equalization technique of the transmitter Tx, a de-emphasis value De is defined as: $De = 20 \times \log[(X-Y)/(X+Y)]$, where Y is the amplitude of the emphasized high-frequency component and X is the amplitude of the original high-frequency component.

Recently, a source series termination (SST) voltage mode transmitter is disclosed. The SST voltage mode transmitter is described in IEEE Journal of Solid-State Circuit, Vol. 43, No. 12, December 2008. FIG. 3 is a schematic circuit diagram illustrating a conventional SST voltage mode transmitter.

As shown in FIG. 3, the transmitter (Tx) 300 comprises N SST units 311~31N and a pre-driver 320. In the N SST units 311~31N, K SST units 311~31K are enabled. Moreover, the K SST units 311~31K are divided into a first portion of X SST units and a second portion of Y SST units, wherein K=X+Y.

In a normal operating situation, the pre-driver 320 controls the X SST units to generate an output signal Vo. For emphasizing the high-frequency component, the pre-driver 320 controls the (X+Y) SST units to generate an output signal Vo. Consequently, the de-emphasis value De is defined as: $De = 20 \times \log[(X-Y)/(X+Y)]$.

Since the transmitter (Tx) 300 adjusts the de-emphasis value De according to the characteristics of the channels, it is necessary to previously design a sufficient number of SST units (e.g. N=100) in the transmitter (Tx) 300. Moreover, according to the characteristics of the channels, the X SST units and the Y SST units are respectively enabled to acquire the desired de-emphasis value De. For example, if X=13 and Y=2, the de-emphasis value De is equal to $20 \times \log[(13-2)/(13+2)]$. Alternatively, if X=25 and Y=8, the de-emphasis value De is equal to $20 \times \log[(25-8)/(25+8)]$.

As mentioned above, it is necessary to previously design a sufficient number of SST units in the transmitter (Tx) 300, and it is necessary to enable the K SST units to acquire the desired de-emphasis value De. Obviously, the total of N SST units may occupy much layout area in the circuitry design. Moreover, since (N-K) SST units of the conventional transmitter (Tx) 300 are disabled and unavailable, an unmatched impedance problem occurs.

In other words, after the de-emphasis value De is adjusted, the number of the enabled of SST units of the conventional transmitter (Tx) 300 is changed. Consequently, the output impedance Zo is changed. Under this circumstance, the unmatched impedance between the transmitter Tx and the receiver Rx occurs. For solving this problem, the conventional transmitter Tx has to be additionally equipped with an impedance calibration circuit. Under this circumstance, the circuitry complexity of the transmitter Tx is increased.

SUMMARY OF THE INVENTION

The present invention provides a voltage mode transmitter with a de-emphasis value controller and a resistive network so as to generate an output signal.

An embodiment of the present invention provides a voltage mode transmitter. The voltage mode transmitter includes a resistive network and a de-emphasis value controller. The resistive network receives plural input voltages and provides plural weighting values corresponding to respective input voltages. A sum of the products of the plural input voltages and the corresponding weighting values is equal to an output voltage. The de-emphasis value controller receives and converts a specific signal to a first signal and a second signal, and there is a phase difference between the second signal and an inverted first signal. The de-emphasis value controller further receives a value control signal. At least one of the plural input signals is provided by the first signal and at least one of the plural input signals is provided by the second signal according to the value control signal.

Another embodiment of the present invention provides a voltage mode transmitter. The voltage mode transmitter includes a first resistive network, a first de-emphasis value controller, a second resistive network and a second de-emphasis value controller. The first resistive network receives N input voltages and provides N weighting values corresponding to respective input voltages. A sum of the products of the N input voltages and the corresponding weighting values is equal to a positive output voltage. The first de-emphasis value controller receives and converts a positive signal to a first signal and a second signal, and there is a first phase difference between the second signal and an inverted first signal. The second resistive network receives M input voltages and provides M weighting values corresponding to respective input voltages. A sum of the products of the M input voltages and the corresponding weighting values is equal to a negative output voltage. The second de-emphasis value controller receives and converts a negative signal to a third signal and a fourth signal, and there is a second phase difference between the fourth signal and an inverted third signal. The first de-emphasis value controller further receives a first value control signal. At least one of the N input signals is provided by the first signal and at least one of the N input signals is provided by the second signal according to the first value control signal. The second de-emphasis value controller further receives a second value control signal. At least one of the M input signals is provided by the third signal and at least one of the M input signals is provided by the fourth signal according to the second value control signal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
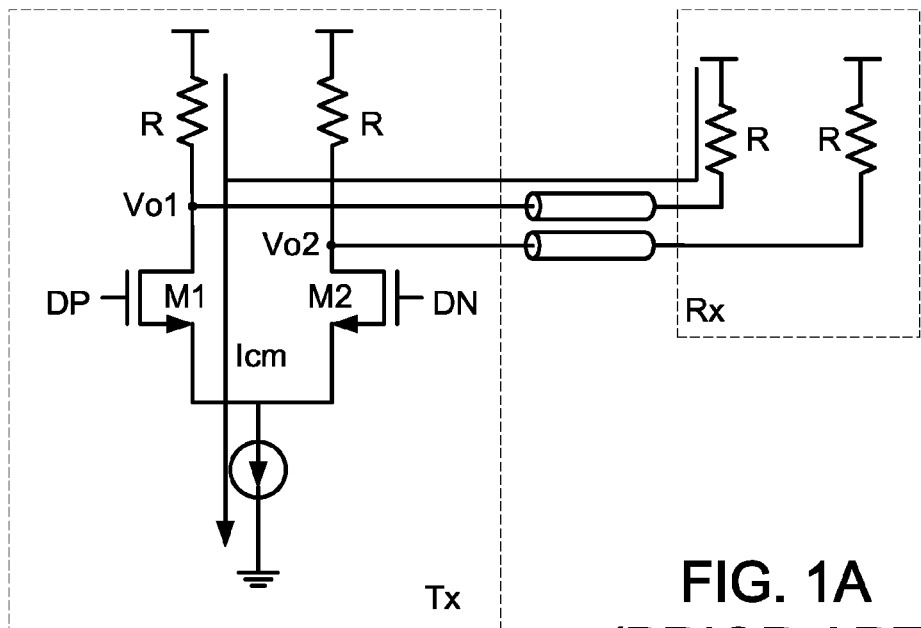
FIG. 1A (prior art) is a schematic circuit diagram illustrating the relationship between a transmitter and a receiver in a current mode according to the prior art.
Figure 1B:
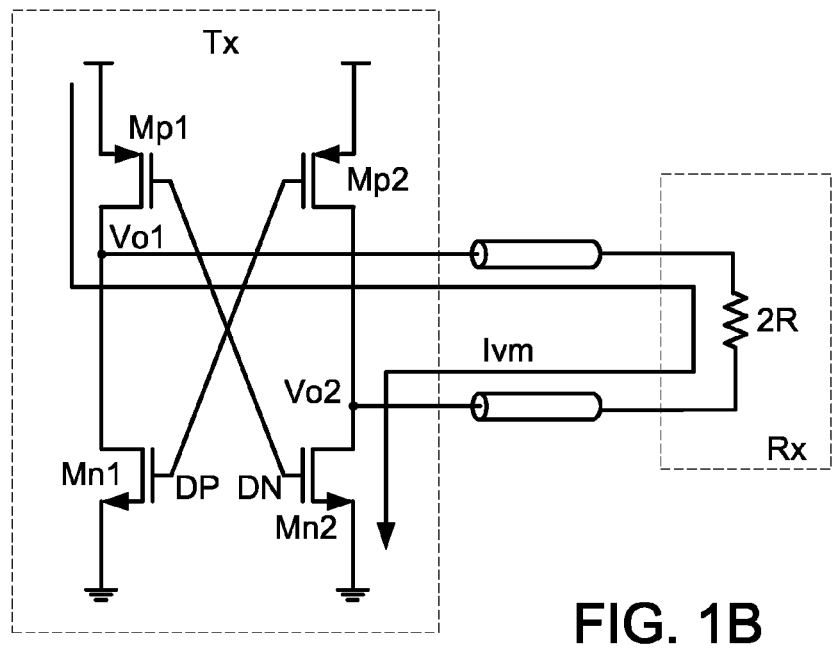
FIG. 1B (prior art) is a schematic circuit diagram illustrating the relationship between a transmitter and a receiver in a voltage mode according to the prior art.
Figure 2A:
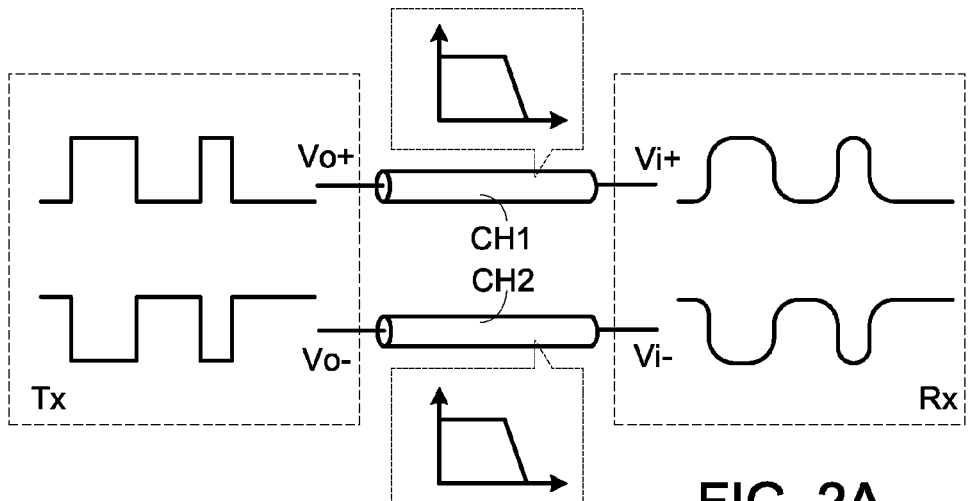
FIG. 2A (prior art) is a schematic timing waveform diagram illustrating the output signals of the transmitter, in which the output signals are not processed by the equalization technique.
Figure 2B:
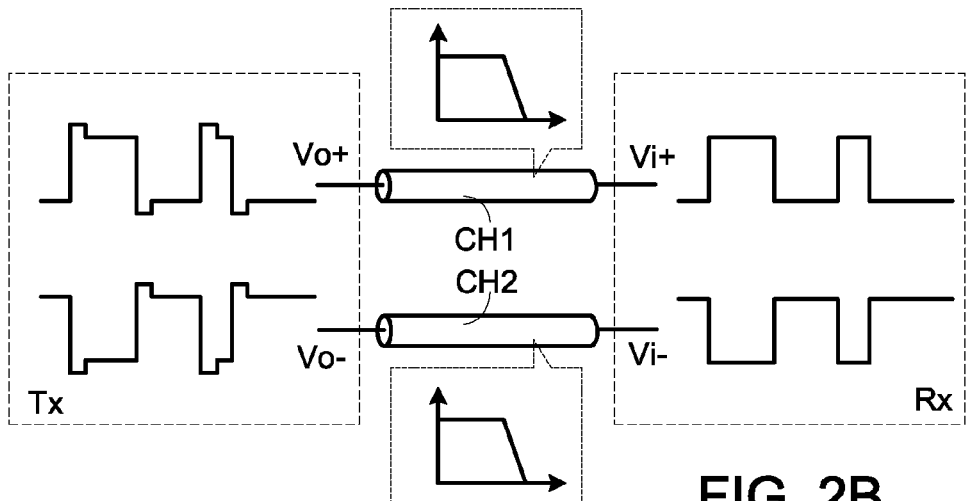
FIG. 2B (prior art) is a schematic timing waveform diagram illustrating the output signals of the transmitter, in which the output signals are processed by the equalization technique.
Figure 2C:
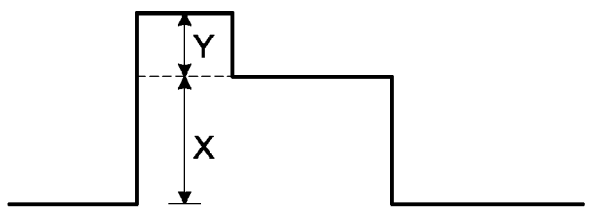
FIG. 2C (prior art) schematically illustrates the definition of a de-emphasis value.
Figure 3:
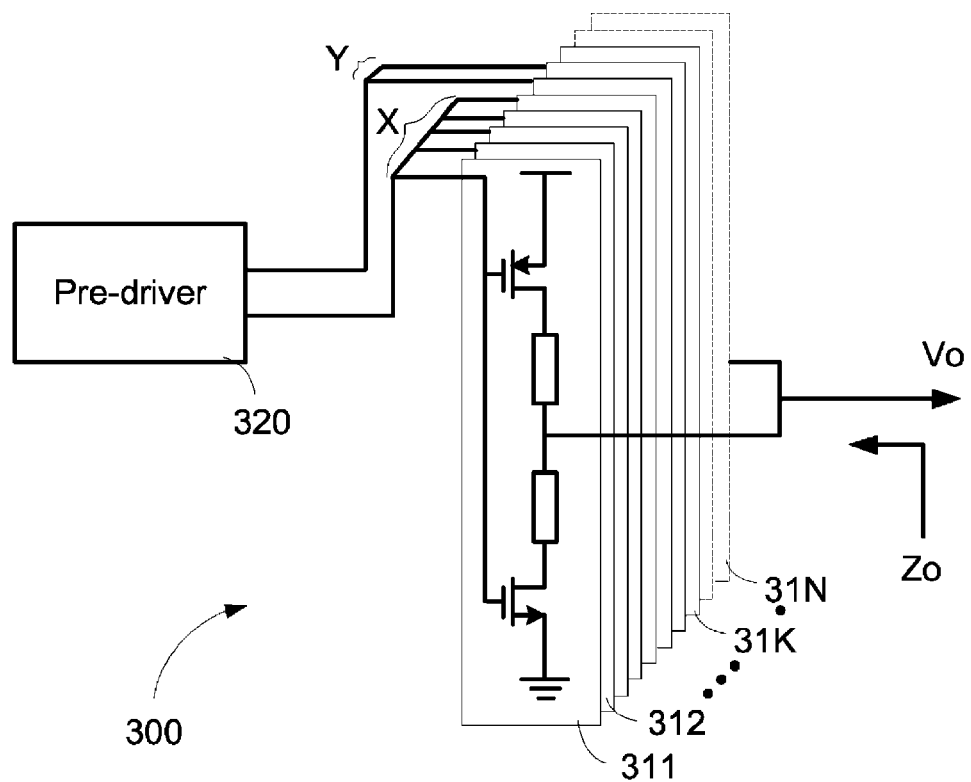
FIG. 3 (prior art) is a schematic circuit diagram illustrating a conventional SST voltage mode transmitter.
Figure 4A:
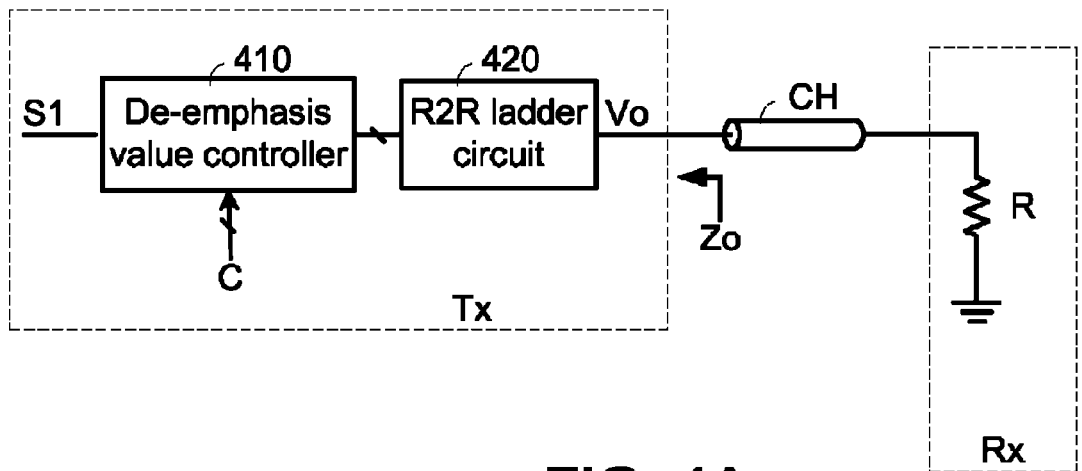
FIG. 4A is a schematic circuit block diagram illustrating a voltage mode transmitter according to a first embodiment of the present invention.

FIG. 4A is a schematic circuit block diagram illustrating a voltage mode transmitter according to a first embodiment of the present invention. In this embodiment, the voltage mode transmitter Tx is a single-ended voltage mode transmitter. By the voltage mode transmitter Tx, a first signal S1 is converted into an output signal Vo. The output signal Vo is transmitted to a receiver Rx through a channel CH.

Moreover, the voltage mode transmitter Tx comprises a de-emphasis value controller 410 and a R2R ladder circuit 420. The de-emphasis value controller 410 receives the specific signal S1 and a value control signal C. By adjusting the value control signal C, the R2R ladder circuit 420 is controlled to generate the output signal Vo with a specified de-emphasis value.

Figure 4B:
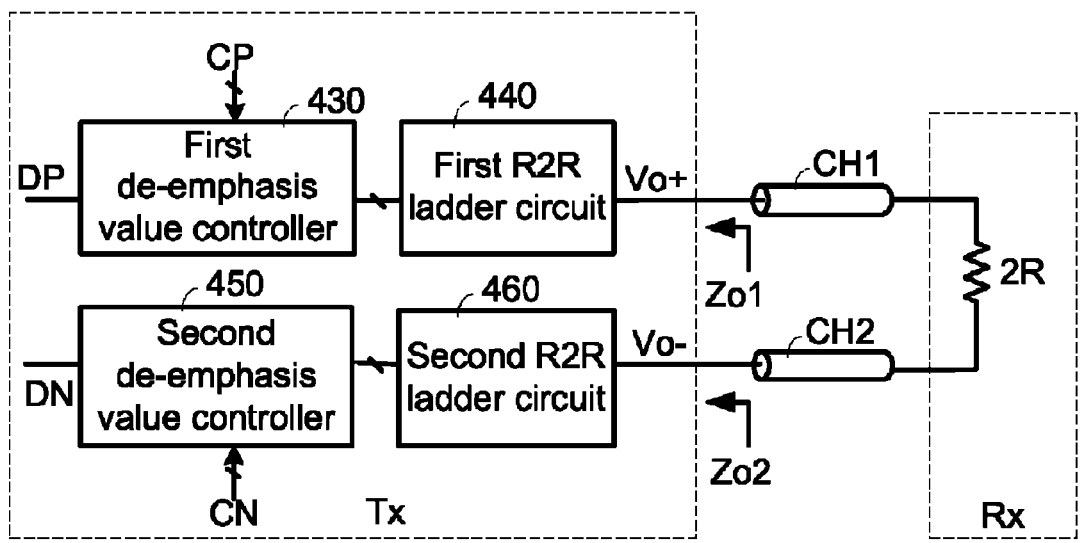
FIG. 4B is a schematic circuit block diagram illustrating a voltage mode transmitter according to a second embodiment of the present invention.

FIG. 4B is a schematic circuit block diagram illustrating a voltage mode transmitter according to a second embodiment of the present invention. In this embodiment, the voltage mode transmitter Tx is a differential voltage mode transmitter. By the voltage mode transmitter Tx, differential signals DP and DN are converted into a positive output signal Vo+ and a negative output signal Vo−, respectively.

These output signals Vo+ and Vo− are transmitted to a receiver Rx through two channels CH1 and CH2. The differential signals DP and DN comprise a positive signal DP and a negative signal DN.

Moreover, the voltage mode transmitter Tx comprises a first de-emphasis value controller 430, a first R2R ladder circuit 440, a second de-emphasis value controller 450 and a second R2R ladder circuit 460. The first de-emphasis value controller 430 receives the positive signal DP and a first value control signal CP. By adjusting the first value control signal CP, the first R2R ladder circuit 440 is controlled to generate the positive output signal Vo+ with a specified de-emphasis value. The second de-emphasis value controller 450 receives the negative signal DN and a second value control signal CN. By adjusting the second value control signal CN, the second R2R ladder circuit 460 is controlled to generate the negative output signal Vo− with a specified de-emphasis value.

Figure 5A:
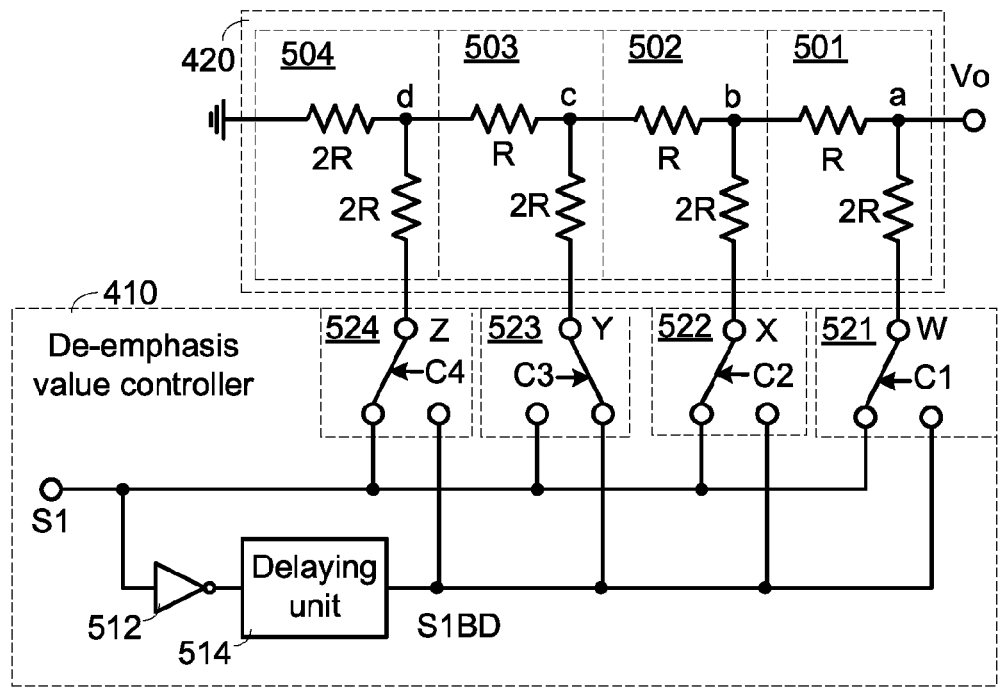
FIG. 5A is a schematic circuit diagram illustrating the detailed circuitry of the voltage mode transmitter according to the first embodiment of the present invention.

Hereinafter, the operations of the voltage mode transmitter of the first embodiment will be illustrated with reference to FIG. 5A. FIG. 5A is a schematic circuit diagram illustrating the detailed circuitry of the voltage mode transmitter according to the first embodiment of the present invention. As shown in FIG. 5A, the R2R ladder circuit 420 comprises plural resistive circuits 501~504. In the first resistive circuit 501, a first terminal of a first resistor (R) and a first terminal of a second resistor (2R) are connected to a first node a. The output signal Vo is outputted from the first node a. A second terminal of the first resistor of the first resistive circuit 501 is connected to a second node b of the second resistive circuit 502. A second terminal of the second resistor of the first resistive circuit 501 receives a first input voltage W. In the second resistive circuit 502, a first terminal of a first resistor (R) and a first terminal of a second resistor (2R) are connected to the second node b. A second terminal of the first resistor of the second resistive circuit 502 is connected to a third node c of the third resistive circuit 503. A second terminal of the second resistor of the second resistive circuit 502 receives a second input voltage X. In the third resistive circuit 503, a first terminal of a first resistor (R) and a first terminal of a second resistor (2R) are connected to the third node c. A second terminal of the first resistor of the third resistive circuit 503 is connected to a fourth node d of the fourth resistive circuit 504. A second terminal of the second resistor of the third resistive circuit 503 receives a third input voltage Y. The fourth resistive circuit 504 is the last resistive circuit. In the fourth resistive circuit 504, a first terminal of a first resistor (2R) and a first terminal of a second resistor (2R) are connected to the fourth node d. A second terminal of the first resistor of the fourth resistive circuit 504 is connected to a ground terminal. A second terminal of the second resistor of the fourth resistive circuit 504 receives a fourth input voltage Z. In the fourth resistive circuit 504, the resistance values of the first resistor and the second resistor are both 2R. In the resistive circuits 501~503, the resistance value of the first resistor is R and the resistance value of the second resistor is 2R.

In this embodiment, the R2R ladder circuit 420 consists of four resistive circuits. It is noted that numerous modifications and alterations may be made while retaining the teachings of the invention. That is, the number of the resistive circuits of the R2R ladder circuit is not restricted. Each of the resistive circuits comprises a first resistor and a second resistor. In each resistive circuit, a first terminal of the first resistor and a first terminal of the second resistor are connected to a node. A second terminal of the first resistor of the resistive circuit is connected to a node of the next resistive circuit. A second terminal of the second resistor of the resistive circuit receives an input voltage. In addition, the output signal Vo is outputted from the node of the first resistive circuit, and a second terminal of the first resistor of the last resistive circuit is connected to the ground terminal. Except for the last resistive circuit, the resistance value of the first resistor is R and the resistance value of the second resistor is 2R. In the last resistive circuit, the resistance values of the first resistor and the second resistor are both 2R.

Please refer to FIG. 5A again. In the four resistive circuits 501~504 of the R2R ladder circuit 420, the relationships between the output voltage Vo and the four input voltages W, X, Y, Z may be expressed as: Vo=(8W+4X+2Y+Z)/16. In other words, the R2R ladder circuit 420 provides plural weighting values corresponding to respective input voltages. After these input voltages are multiplied by the respective weighting values, the sum of the products of the input voltages and the respective weighting values is equal to the output voltage Vo.

Moreover, the de-emphasis value controller 410 comprises an inverter 512, a delaying unit 514 and four selecting units 521~524. The inverter 512 and the delaying unit 514 are connected with each other in series. First, the specific signal S1 can be seen as the first signal S1, that means the specific signal S1 and the first signal S1 are the same. After the first signal S1 is inverted as an inverted first signal S1 by the inverter 512, the inverted first signal S1 is delayed for a time period T by the delaying unit 514. Consequently, a second signal S1BD is generated. Of course, even if the positions of the inverter 512 and the delaying unit 514 are exchanged, the first signal S1 can be processed as the second signal S1BD by the inverter 512 and the delaying unit 514. It is noted that the value of the time period T is not restricted. That is, the time period T may be varied according to the practical requirements.

In this embodiment, the number of the selecting units 521~524 is identical to the number of the input voltages of the R2R ladder circuit 420. Moreover, the first signal S1 or the second signal S1BD is selected as the four input voltages W, X, Y and Z according to the value control signal C.

For example, as shown in FIG. 5A, the first signal S1 is selected as the first input signal W by the first selecting unit 521 according to a first value control signal C1 of the value control signal C. Moreover, the first signal S1 is selected as the second input signal X by the second selecting unit 522 according to a second value control signal C2 of the value control signal C. Moreover, the second signal S1BD is selected as the third input signal Y by the third selecting unit 523 according to a third value control signal C3 of the value control signal C. Moreover, the first signal S1 is selected as the fourth input signal Z by the fourth selecting unit 524 according to a fourth value control signal C4 of the value control signal C. In this embodiment, the examples of the selecting units 521~524 include but are not limited to switches or multiplexers.

Figure 5B:
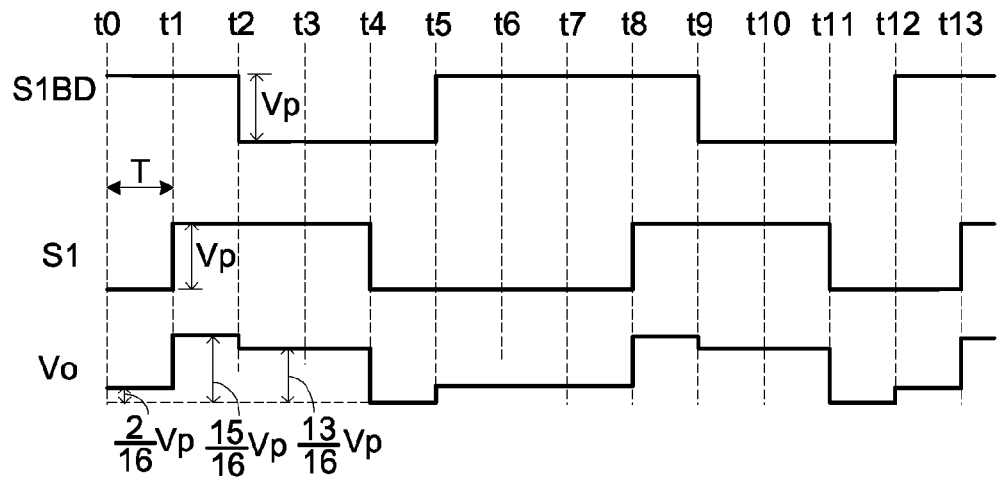
FIG. 5B is a schematic timing waveform diagram illustrating the relationships between the first signal S1, the second signal S1BD and the output voltage Vo of the voltage mode transmitter of FIG. 5A.

FIG. 5B is a schematic timing waveform diagram illustrating the relationships between the first signal S1, the second signal S1BD and the output voltage Vo of the voltage mode transmitter of FIG. 5A. Obviously, there is a phase difference between the second signal S1BD and the inverted first signal, and the phase difference is depended on the time delay T controlled by the delaying unit 514. As shown in FIG. 5, each of the first signal S1 and the second signal S1BD has a high voltage level (=Vp) and a low voltage level (=0). The second signal S1BD is obtained by inverting the first signal S1 and delaying the inverted first signal S1 for a time period T. In FIG. 5B, the time interval between every two adjacent time points is equal to the time period T.

In the time interval between the time point t0 and the time point t1, the output voltage Vo=(8W+4X+2Y+Z)/16=(8×S1+4×S1+2×S1BD+S1)/16=(8×0+4×0+2×Vp+0)/16=(2×Vp)/16.

In the time interval between the time point t1 and the time point t2, the output voltage Vo=(8W+4X+2Y+Z)/16=(8×Vp+4×Vp+2×Vp+Vp)/16=(15×Vp)/16.

In the time interval between the time point t2 and the time point t4, the output voltage Vo=(8W+4X+2Y+Z)/16=(8×Vp+4×Vp+2×0+Vp)/16=(13×Vp)/16.

In the time interval between the time point t4 and the time point t5, the output voltage Vo=(8W+4X+2Y+Z)/16=(8×0+4×0+2×0+0)/16=0.

The magnitudes of the output voltage Vo in the time interval between the time point t5 and the time point t13 are obtained by the above method, and are not redundantly described herein.

Consequently, in the transmitter Tx of the first embodiment as shown in FIGS. 5A and 5B, the de-emphasis value De of the output voltage Vo may be expressed as De=20×log{[(13/16)−(2/16)]×Vp/[(13/16)+(2/16)]×Vp}=20×log(11/15).

Figure 6A:
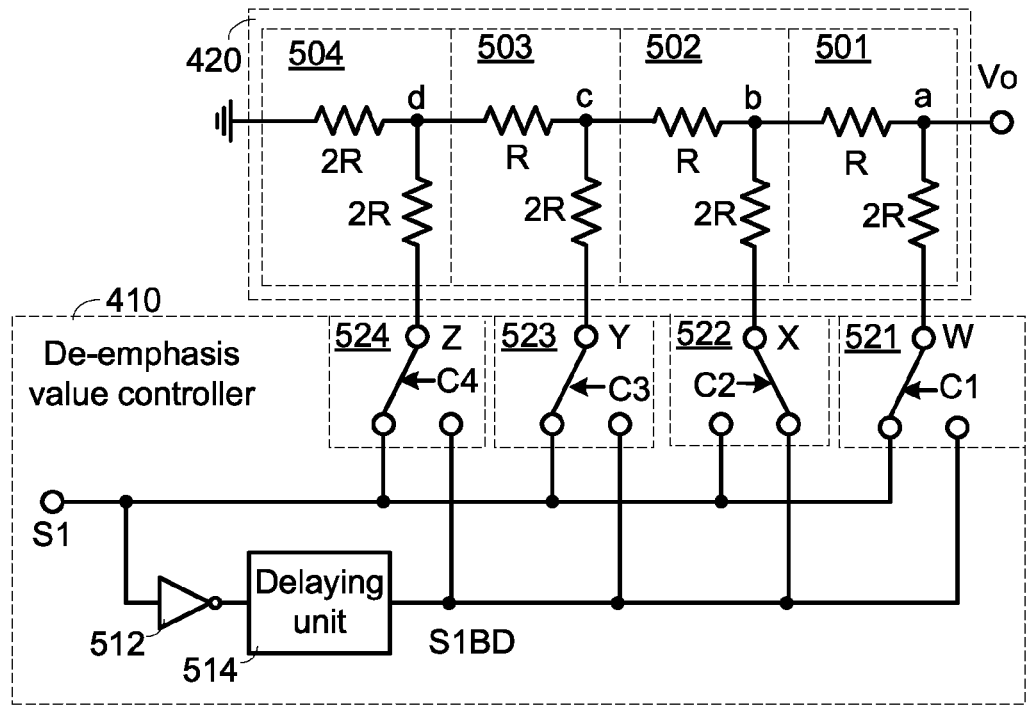
FIG. 6A is a schematic circuit diagram illustrating the detailed circuitry of the voltage mode transmitter according to the first embodiment of the present invention, in which the de-emphasis value of the output voltage is changed by adjusting the value control signal.
Figure 6B:
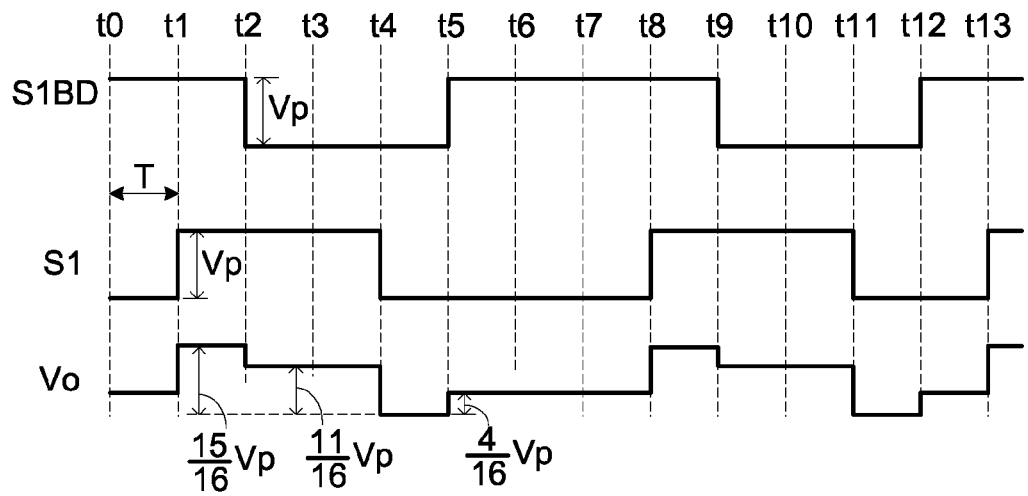
FIG. 6B is a schematic timing waveform diagram illustrating the relationships between the first signal S1, the second signal S1BD and the output voltage Vo of FIG. 6A.

Moreover, in the first embodiment, the de-emphasis value De of the output voltage Vo may be changed by adjusting the value control signal C. FIG. 6A is a schematic circuit diagram illustrating the detailed circuitry of the voltage mode transmitter according to the first embodiment of the present invention, in which the de-emphasis value of the output voltage is changed by adjusting the value control signal. FIG. 6B is a schematic timing waveform diagram illustrating the relationships between the first signal S1, the second signal S1BD and the output voltage Vo of FIG. 6A. The same, the specific signal S1 can be seen as the first signal S1. As shown in FIG. 6A, the first signal S1 is selected as the first input signal W by the first selecting unit 521 according to a first value control signal C1 of the value control signal C. Moreover, the second signal S1BD is selected as the second input signal X by the second selecting unit 522 according to a second value control signal C2 of the value control signal C. Moreover, the first signal S1 is selected as the third input signal Y by the third selecting unit 523 according to a third value control signal C3 of the value control signal C. Moreover, the first signal S1 is selected as the fourth input signal Z by the fourth selecting unit 524 according to a fourth value control signal C4 of the value control signal C.

Consequently, in the transmitter Tx of the first embodiment as shown in FIGS. 6A and 6B, the de-emphasis value De of the output voltage Vo may be expressed as De=20×log(7/15).

From the above descriptions, the present invention provides a voltage mode transmitter Tx. The voltage mode transmitter Tx comprises a de-emphasis value controller and a R2R ladder circuit. Moreover, the de-emphasis value De of the output voltage Vo may be changed by adjusting the value control signal C of the de-emphasis value controller.

In accordance with a benefit of the present invention, the output impedance of the R2R ladder circuit can be maintained at the fixed resistance value R. As shown in FIG. 4A, regardless of the change of the value control signal C, the output impedance Zo of the transmitter Tx is maintained at the fixed resistance value R. Consequently, in case that the receiver Rx is equipped with a resistor having a resistance value R, the impedance matching efficacy is achievable.

The operations of the voltage mode transmitter of the second embodiment as shown in FIG. 4B are similar. That is, the differential signals DP and DN are processed as the differential output signals Vo+ and Vo−. The circuitry structure of each of the first de-emphasis value controller 430 and the second de-emphasis value controller 450 of the second embodiment is similar to the circuitry structure of the de-emphasis value controller 410 of the first embodiment. The circuitry structure of each of the first R2R ladder circuit 440 and the second R2R ladder circuit 460 of the second embodiment is similar to the circuitry structure of the R2R ladder circuit 420 of the first embodiment.

As shown in FIG. 4B, regardless of the change of the value control signals CP and CN, the output impedance Zo1 of the first R2R ladder circuit 440 and the output impedance Zo2 of the second R2R ladder circuit 460 are maintained at the fixed resistance value R, and thus the total output impedance of the transmitter Tx is equal to 2R. Consequently, in case that the receiver Rx is equipped with a resistor having a resistance value 2R, the impedance matching efficacy is achievable.

In the embodiments, the voltage mode transmitter Tx comprises a de-emphasis value controller and a R2R ladder circuit. It is noted that numerous modifications and alterations may be made while retaining the teachings of the invention. In some other embodiments, a resistive network may be designed according to plural weighting values corresponding to respective input voltages. In other words, the resistive network and the de-emphasis value controller may be collaboratively formed as the voltage mode transmitter.

Figure 7A:
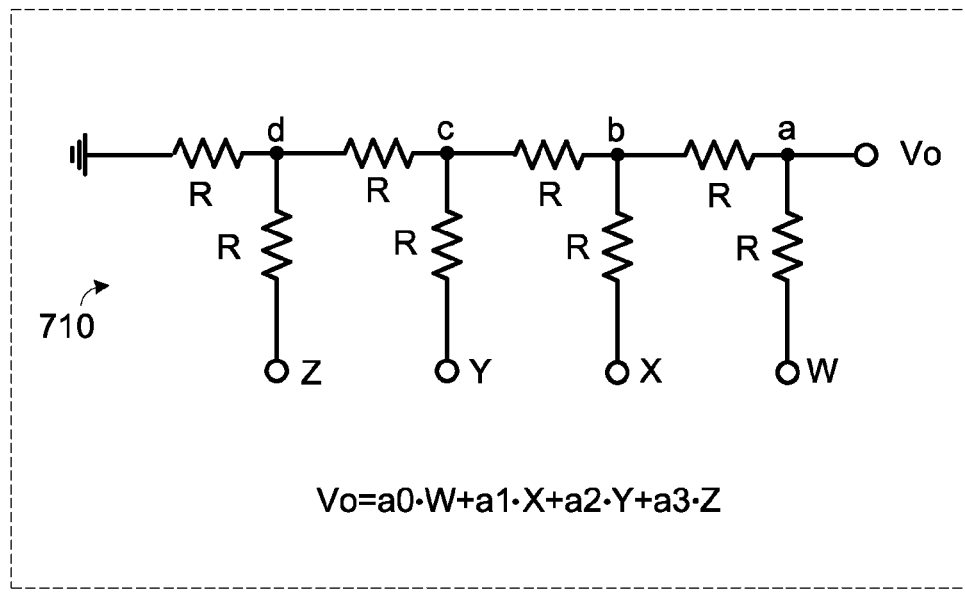
FIGS. 7A and 7B schematically illustrating two exemplary resistive networks used in the voltage mode transmitter of the present invention.
Figure 7B:
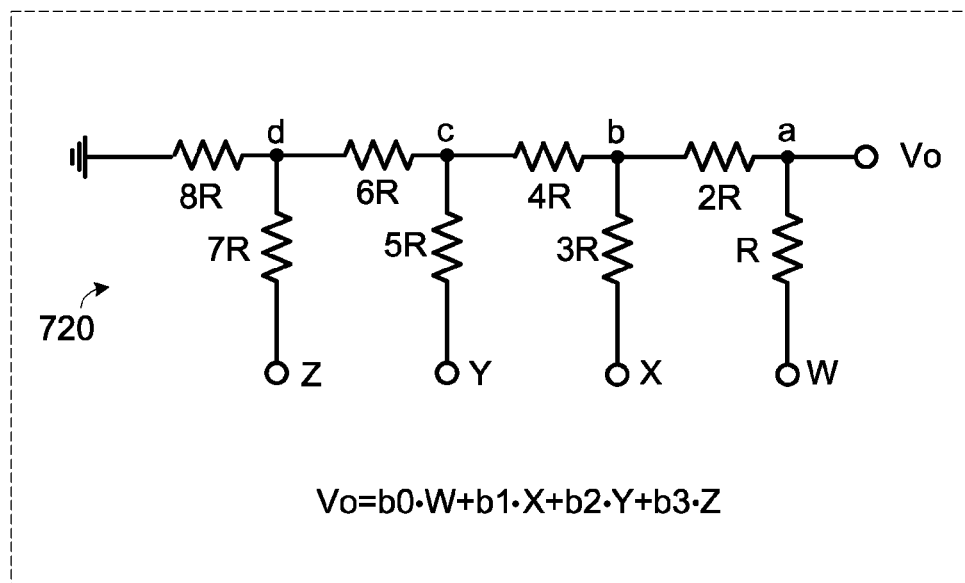

FIGS. 7A and 7B schematically illustrating two exemplary resistive networks used in the voltage mode transmitter of the present invention. The resistive network 710 of FIG. 7A comprises plural resistors, wherein each of the resistors has the resistance value R. Consequently, the output voltage Vo may be expressed as: Vo=a0×W+a1×X+a2×Y+a3×Z. The resistive network 720 of FIG. 7B comprises plural resistors, wherein the resistors have specified resistance values. Consequently, the output voltage Vo may be expressed as: Vo=b0×W+b1×X+b2×Y+b3×Z.

Figure 8:
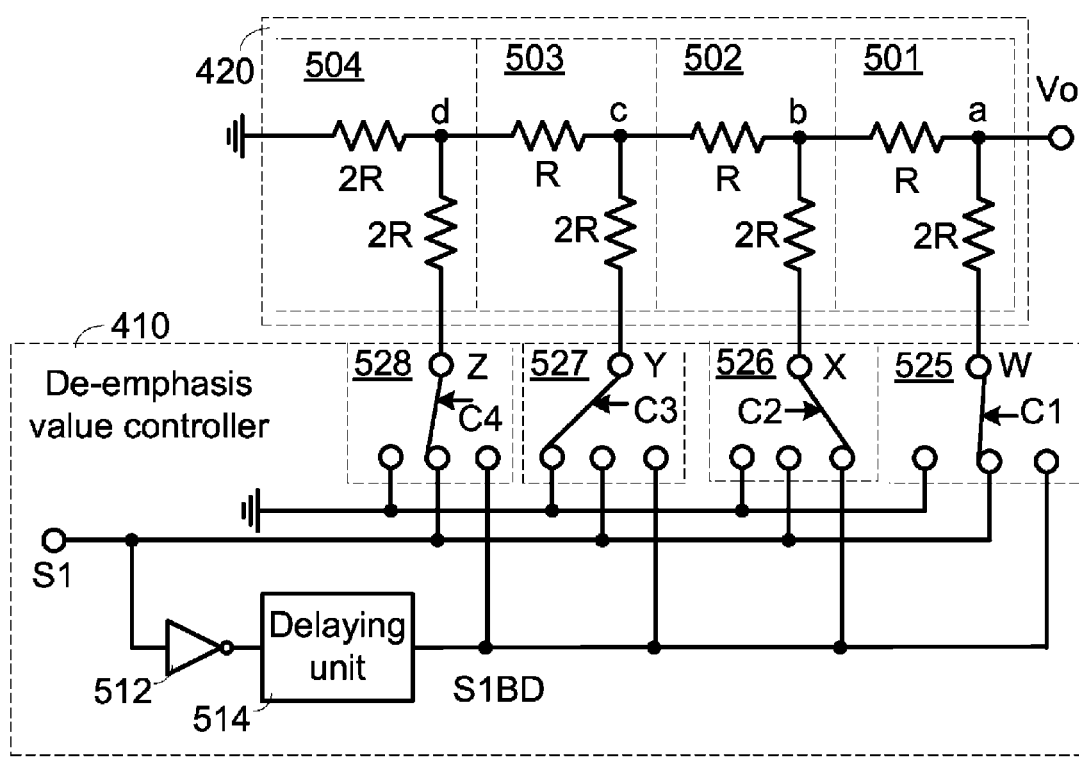
FIG. 8 is a schematic circuit block diagram illustrating a voltage mode transmitter according to a third embodiment of the present invention.

FIG. 8 is a schematic circuit block diagram illustrating a voltage mode transmitter according to a third embodiment of the present invention. Like the first embodiment, the voltage mode transmitter Tx o this embodiment comprises a de-emphasis value controller 410 and a R2R ladder circuit 420. The R2R ladder circuit 420 comprises plural resistive circuits 501~504. Moreover, the de-emphasis value controller 410 comprises an inverter 512, a delaying unit 514 and four selecting units 525~528. In comparison with the first embodiment, a first signal S1, a second signal S1BD or a ground voltage is selected as the four input voltages W, X, Y and Z according to the value control signal C. For example, as shown in FIG. 8, the third input voltage Y is connected to the ground voltage. Under this circumstance, the relationships between the output voltage Vo and the four input voltages W, X, Y, Z may be expressed as: Vo=(8W+4X+Z)/16. Alternatively, in some other embodiments, the ground voltage may be replaced by another voltage (e.g. a power supply voltage VDD). That is, the first signal S1, the second signal S1BD or the power supply voltage VDD is selected as the four input voltages W, X, Y and Z according to the value control signal C.

Moreover, in the R2R ladder circuit or the resistive network, at least one input voltage should be provided by the first signal S1 and at least one input voltage should be provided by the second signal S1BD. Consequently, the output voltage Vo has the de-emphasis value De.

Furthermore, there is another way to implement the phase difference between the second signal S1BD and the inverted first signal. For example, an inverter is used for inverting the specific signal S1 as the first signal, and that means the specific signal S1 is the inverted first signal. Also, a delaying unit is used for delaying the specific signal for a time period T as the second signal. In this way, a phase difference between the second signal S1BD and the inverted first signal is realized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voltage mode transmitter, comprising:
    a de-emphasis value controller, receiving a first signal and a value control signal, converting said first signal to a second signal, and outputting a first voltage and a second voltage based on said value control signal; and
    a resistor network, receiving said first voltage and said second voltage, assigning a first weighting value to said first voltage, assigning a second weighting value to said second voltage, and outputting an output voltage corresponding to a set of factors comprising:
        said first voltage multiplied by said first weighting value; and
        said second voltage multiplied by said second weighting value.

2. The voltage mode transmitter as claimed in claim 1, wherein the resistor network is an R2R ladder circuit.

3. The voltage mode transmitter as claimed in claim 2, wherein the R2R ladder circuit comprises plural resistive circuits, wherein each of the plural resistive circuits comprises a first resistor and a second resistor, a first terminal of the first resistor and a first terminal of the second resistor of each resistive circuit are connected to a node, and a second terminal of the second resistor of the resistive circuit receives the corresponding input voltage, wherein a second terminal of the first resistor of the last resistive circuit is connected to a ground terminal, and a second terminal of the first resistor of each resistive circuit other than the last resistive circuit is connected to a node of a next resistive circuit, wherein resistance values of the first resistor and the second resistor of the last resistive circuit are both 2R, and resistance values of the first resistor and the second resistor of each resistive circuit other than the last resistive circuit are R and 2R, respectively, wherein the output voltage is outputted from the node of the first resistive circuit.

4. The voltage mode transmitter as claimed in claim 1, wherein the de-emphasis value controller comprises:
    an inverter, inverting the first signal to an inverted first signal;
    a phase shifter circuit, generating the second signal by delaying the inverted first signal for a time period; and
    plural switches or multiplexers, receiving the first signal and the second signal, wherein the first signal is selected as at least one of plural input signals to said resistor network by at least one of the plural switches or multiplexers and the second signal is selected as at least one of the plural input signals by at least one of the plural switches or multiplexers according to the value control signal.

5. The voltage mode transmitter as claimed in claim 1, wherein the de-emphasis value controller comprises:
    an inverter, inverting an initial signal into the first signal;
    a phase shifter circuit, delaying the initial signal for a time period into the second signal; and
    plural switches or multiplexers receiving the first signal and the second signal, wherein the first signal is selected as at least one of plural input signals to said resistor network by at least one of the plural switches or multiplexers and the second signal is selected as at least one of the plural input signals by at least one of the plural switches or multiplexers according to the value control signal.

6. The voltage mode transmitter as claimed in claim 1, wherein the voltage mode transmitter is a single-ended voltage mode transmitter, wherein the output voltage is transmitted from the single-ended voltage mode transmitter to a single-ended receiver through a channel.

7. The voltage mode transmitter as claimed in claim 1, wherein each of said first voltage and said second voltage is either said first signal or said second signal.

8. A voltage mode transmitter, comprising:
    a first de-emphasis value controller, receiving a first positive signal and a first value control signal, converting said first positive signal to a second positive signal, and outputting a first positive voltage and a second positive voltage based on said first value control signal;
    a first resistor network, receiving said first positive voltage and said second positive voltage, assigning a first weighting value to said first positive voltage, assigning a second weighting value to said second positive voltage, and outputting a positive output voltage corresponding to a first set of factors comprising:
        said first positive voltage multiplied by said first weighting value; and
        said second positive voltage multiplied by said second weighting value;
    a second de-emphasis value controller, receiving a first negative signal and a second value control signal, converting said first negative signal to a second negative signal, and outputting a first negative voltage and a second negative voltage based on said second value control signal; and
    a second resistor network, receiving said first negative voltage and said second negative voltage, assigning a third weighting value to said first negative voltage, assigning a fourth weighting value to said second negative voltage, and outputting a negative output voltage corresponding to a first set of factors comprising:
        said first negative voltage multiplied by said third weighting value; and
        said second negative voltage multiplied by said fourth weighting value.

9. The voltage mode transmitter as claimed in claim 8, wherein the first resistor network is a first R2R ladder circuit.

10. The voltage mode transmitter as claimed in claim 9, wherein the first R2R ladder circuit comprises N resistive circuits, wherein each of the N resistive circuits comprises a first resistor and a second resistor, a first terminal of the first resistor and a first terminal of the second resistor of each resistive circuit are connected to a node, and a second terminal of the second resistor of the resistive circuit receives the corresponding input voltage, wherein a second terminal of the first resistor of the N-th resistive circuit is connected to a ground terminal, and a second terminal of the first resistor of each resistive circuit other than the N-th resistive circuit is connected to a node of a next resistive circuit, wherein resistance values of the first resistor and the second resistor of the N-th resistive circuit are both 2R, and resistance values of the first resistor and the second resistor of each resistive circuit other than the N-th resistive circuit are R and 2R, respectively, wherein the output voltage is outputted from the node of the first resistive circuit.

11. The voltage mode transmitter as claimed in claim 9, wherein the second resistor network is a second R2R ladder circuit.

12. The voltage mode transmitter as claimed in claim 8, wherein the first de-emphasis value controller comprises:
   an inverter, inverting the first positive signal to an inverted first positive signal;
   a phase shifter circuit, generating the second positive signal by delaying the inverted first positive signal for a first time period; and
   N switches or multiplexers, receiving the first positive signal and the second positive signal, wherein the first signal is selected as at least one of N input signals to said first resistor network by at least one of the N switches or multiplexers and the second signal is selected as at least one of the N input signals by at least one of the N switches or multiplexers according to the first value control signal.

13. The voltage mode transmitter as claimed in claim 8, wherein the first de-emphasis value controller comprises:
   an inverter, inverting an initial positive signal into the first signal;
   a phase shifter circuit, delaying the initial positive signal for a first time period into the second signal; and
   N switches or multiplexers receiving the first signal and the second signal, wherein the first signal is selected as at least one of N input signals by at least one of the N switches or multiplexers and the second signal is selected as at least one of the N input signals by at least one of the N switches or multiplexers according to the first value control signal.

14. The voltage mode transmitter as claimed in claim 8, wherein the voltage mode transmitter is a differential voltage mode transmitter, wherein the positive output voltage and the negative output voltage are transmitted from the differential voltage mode transmitter to a differential receiver through a first channel and a second channel, respectively.

15. The voltage mode transmitter as claimed in claim 8, wherein each of said first positive voltage and said second positive voltage is either said first positive signal or said second positive signal.

16. The voltage mode transmitter as claimed in claim 8, wherein each of said first negative voltage and said second negative voltage is either said first negative signal or said second negative signal.

17. The voltage mode transmitter as claimed in claim 8, wherein each of said first positive voltage and said second positive voltage is either said first positive signal or said second positive signal, and each of said first negative voltage and said second negative voltage is either said first negative signal or said second negative signal.

18. The voltage mode transmitter as claimed in claim 8, wherein the second resistor network is an R2R ladder circuit.

\* \* \* \* \*